United States Patent
Bostick et al.

(10) Patent No.: US 10,154,071 B2
(45) Date of Patent: Dec. 11, 2018

(54) GROUP CHAT WITH DYNAMIC BACKGROUND IMAGES AND CONTENT FROM SOCIAL MEDIA

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 14/811,963

(22) Filed: Jul. 29, 2015

(65) Prior Publication Data

US 2017/0034226 A1    Feb. 2, 2017

(51) Int. Cl.
| | |
|---|---|
| *G06F 15/16* | (2006.01) |
| *H04L 29/06* | (2006.01) |
| *G06K 9/00* | (2006.01) |
| *G06F 17/27* | (2006.01) |

(52) U.S. Cl.
CPC ........ *H04L 65/403* (2013.01); *G06F 17/2745* (2013.01); *G06F 17/2785* (2013.01); *G06K 9/00228* (2013.01); *G06K 9/00288* (2013.01)

(58) Field of Classification Search
CPC .............. H04L 65/403; G06F 17/2745; G06F 17/2785; G06K 9/00228; G06K 9/00288
See application file for complete search history.

(56) References Cited

U.S. PATENT DOCUMENTS

| | | | |
|---|---|---|---|
| 7,499,969 B1 * | 3/2009 | van Os | H04M 3/56 709/203 |
| 7,580,568 B1 | 8/2009 | Wang et al. | |
| 7,617,283 B2 | 11/2009 | Aaron et al. | |

(Continued)

FOREIGN PATENT DOCUMENTS

WO    2007134402 A1    11/2007

OTHER PUBLICATIONS

Bostick et al., "Point in Time Expression of Emotion Data Gathered From a Chat Session", U.S. Appl. No. 14/621,769, filed Feb. 13, 2015, pp. 1-49.

*Primary Examiner* — John B Walsh
(74) *Attorney, Agent, or Firm* — James H. Mayfield; Jose A. Medina-Cruz; William H. Hartwell

(57) ABSTRACT

A method, executed by a computer, for displaying dynamic content in a group communication environment includes determining a topic of a communication session having multiple participants, searching repositories for content corresponding to the topic, determining the participants' identities, retrieving the content, and enabling the participants to view the content. In some embodiments, the content is an image containing a face of a participant, and a speech indicator is displayed at the face of each participant as they comment in the communication session. In some embodiments, the relationship between the topic and the content is predefined. The topic of the communication session may be determined using natural language processing techniques. A computer program product and computer system corresponding to the above method are also disclosed herein.

11 Claims, 5 Drawing Sheets

(56) References Cited

U.S. PATENT DOCUMENTS

| | | | |
|---|---|---|---|
| 7,853,881 B1 | 12/2010 | Aly Assal et al. | |
| 8,539,359 B2 | 9/2013 | Rapaport et al. | |
| 8,782,145 B2 | 7/2014 | Cherukuri et al. | |
| 8,832,570 B1 | 9/2014 | Marra | |
| 9,652,719 B2 * | 5/2017 | Bounouane | G06N 7/005 |
| 2008/0077595 A1 * | 3/2008 | Leebow | G06Q 10/10 |
| 2008/0240379 A1 | 10/2008 | Maislos et al. | |
| 2011/0038512 A1 * | 2/2011 | Petrou | G06F 17/30256 382/118 |
| 2011/0237229 A1 * | 9/2011 | Shimagaki | H04M 1/27455 455/414.1 |
| 2012/0011454 A1 | 1/2012 | Droz et al. | |
| 2012/0209954 A1 * | 8/2012 | Wright | H04L 43/0817 709/217 |
| 2013/0156275 A1 * | 6/2013 | Amacker | G06K 9/00677 382/118 |
| 2013/0307920 A1 | 11/2013 | Cahill et al. | |
| 2014/0006977 A1 | 1/2014 | Adams | |
| 2014/0082100 A1 * | 3/2014 | Sammon | G06Q 10/109 709/206 |
| 2015/0256633 A1 * | 9/2015 | Chand | G06K 9/00536 382/103 |
| 2016/0065731 A1 * | 3/2016 | Kurstak | H04M 1/72519 455/414.1 |
| 2016/0078245 A1 * | 3/2016 | Amarendran | G06F 21/6218 713/193 |

\* cited by examiner

GROUP CHAT WITH DYNAMIC BACKGROUND IMAGES AND CONTENT FROM SOCIAL MEDIA

BACKGROUND OF THE INVENTION

The present invention relates generally to group communication, and more specifically, to group chat.

A group communication session, chat, or chatroom enables multiple participants to jointly communicate. Each participant may send messages to all of the other participants, as well as receive messages from the other participants. Group chat is typically a form of synchronous conferencing, but is occasionally used to refer to asynchronous conferencing. The term can refer to technologies such as real-time online chat, instant messaging, in-game communication, online forums, or fully-immersive graphical social environments.

SUMMARY

As disclosed herein, a method, executed by a computer, for displaying dynamic content in a group communication environment includes determining a topic of a communication session having multiple participants, searching repositories for content corresponding to the topic, determining the participants' identities, retrieving the content, and enabling the participants to view the content. In some embodiments, the content is an image containing a face of a participant, and a speech indicator is displayed at the face of each participant as they comment in the communication session. In some embodiments, the relationship between the topic and the content is predefined. The topic of the communication session may be determined using natural language processing techniques. A computer program product and computer system corresponding to the above method are also disclosed herein.

DETAILED DESCRIPTION

Embodiments of the present invention relate generally to group chat, and more specifically, to displaying dynamic background images in a group chat. The present invention may enhance typical group conversations by providing content that is relevant to the topic(s) of conversation. For example, if a conversation relates to a meeting, the conversation participants may be automatically presented with the itinerary of the meeting. The present invention may apply to any sort of group communication, including but not limited to chat rooms, multi-user SMS, blogs, or the like.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1:
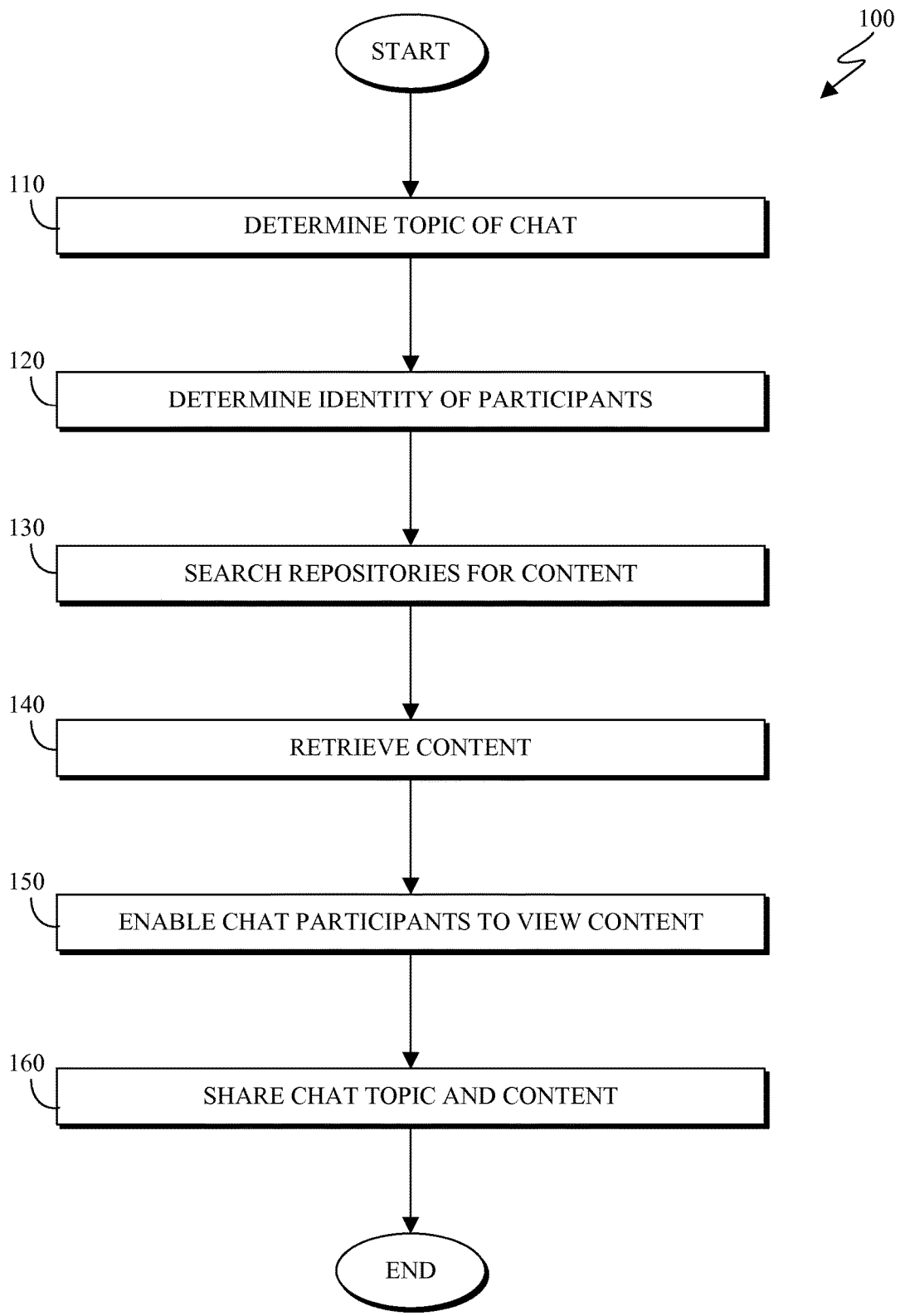
FIG. 1 is a flowchart depicting one embodiment of a method for updating a communication environment in accordance with the present invention.

FIG. 1 is a flowchart of one embodiment of a communication environment updating method 100 in accordance with the present invention. As depicted, the communication environment updating method 100 includes determining (110) the topic(s), determining (120) identities, searching (130) repositories, retrieving (140) content, enabling (150) participants to view the content, and sharing (160) the chat. Executing the dynamic updating method 100 many times over the course of a chat may provide content that stays relevant to the chatters' discussion as the conversation progresses through many topics. The communication environment updating method 100 may thus continually provide a chat with new content in a completely automated fashion.

Determining (110) the topic(s) of a chat may include analyzing the group chat conversation and deriving meaning from the input. A group chat may consist of a variety of topics that are sequentially and/or simultaneously discussed. In some embodiments, chat participants discuss more than one topic simultaneously; this is especially the case in larger group chats.

The topic may be determined by a natural language processing approach. In some embodiments, deep parsing is used to break a sentence down into noun phrases, verb phrases, and prepositional phrases. Lemmatization is one technique that may be applied to the conversational stream in analyzing the input. Lemmatization is the process of grouping together different inflected forms of a word such that it can be analyzed as a single item. This may enable filters to work in spite of variations of input. For example, "walking," "walks," "walked" all have a lemma of "walk." Ontology driven techniques (a model for describing the world that consists of a set of properties and relationship types) may also be used. Businesses may be set-up to use analytics to mine the stream of conversation using "triples". A triple is the functional decomposition of any sentence. The triple is composed of a subject→predicate→object. The predicate is the main verb of the sentence, the object is the direct object of that verb (the action recipient). The subject is the verb agent, i.e., the one who carries out the action. By decomposing language into triples, it may be better understood how the entities relate to each other and enable navigation through unstructured text (via a triple store). A variety of other models may be used to achieve classification, such as maximum entropy, deep learning, and/or neural net models.

Determining (120) the identities of the chat participants may include relating each chat participant's chat username to their actual identity. In some embodiments, the chat participant's username is the same as their first and/or surname. The chat participant may have the option to enter their name when they sign up for their chat account, or to link their chat username to one or more of the chat participant's social media accounts. In some embodiments, software installed on a chat server facilitates the identity determination operation 120.

Searching (130) repositories for content may include finding content regarding the chat topic(s) and/or the identities of the chat participants. In some embodiments, the content represents a relationship between the topic(s) and participants' identities. For example, if the topic of conversation is an upcoming vacation, the repository search operation 130 may extract and compare the chat participants' schedules to a cruise liner's schedule to determine a time window in which some or all of the participants can vacation together. In some embodiments, the content's metadata contains searchable face tags of the chat participants, which are the names or identities of the participants who are captured in that particular content.

The repository or repositories may include any location in which data is stored, such as databases, pure unstructured text content, search websites, or the like. In some embodiments, the repositories that are searched are databases such as social media databases containing pictures, videos, and other media that are associated with chat participants. For example, image content may contain name and face metadata that enables the database search operation 130 to find images that contain the chat participant's face, and furthermore, which spatial region of the image the particular chat participant's face is in (i.e., if there is a group photograph, which person in the photograph is the chat participant). The content may be tagged with the participants' names/identities by automated facial recognition processes or manually by the participants themselves or other users to whom the participants' identities and appearances are known. In some embodiments, the repository searching operation 130 is performed with an automatic indexer or web crawler that forms a database of chat participants' identities and depictions of the participants in various media.

Retrieving (140) dynamic content may include transferring the content obtained at the repository searching operation 130 to a location accessible by the chat server. In some embodiments, the location to which the dynamic content is transferred is a location that is local to the chat server. As long as the content is accessible by the chat server and/or the chat participants, the content may be stored in a location local or remote to any of the parties. Bandwidth considerations may make it desirable to host the content in a particular location, or even multiple locations.

Enabling (150) chat participants to view the content may include automatically inserting the content into the chat in such a manner that the chat participants may view and/or interact with the content. In some embodiments, the content is placed in-line with the chat messages. A hyperlink to the content may be placed into the chat text box or adjacent to the chat window. In some embodiments, each chat participant may activate a preference toggle to decide whether they prefer to content directly in the chat, as a hyperlink, or both.

Sharing (160) the chat history, topic(s), and/or content may include uploading the chat history, topic, and/or content to a location accessible by others. In some embodiments, the chat is hosted on a database, and links to the database are shared on one or more social media platforms. Sharing (160) the chat history, topic(s) and/or content may be done in a semi-private or invite-only manner to enable access by friends while preventing access to the general public. In some embodiments, the chat history and corresponding content is organized by topics so that a reader may skip from topic to topic before exploring the chat participants' chat history relating to a particular topic. The chat may be shared on a topic-by-topic basis and particular topics may be marked as "off the record" or specifically designated as shared topics.

Figure 2A:
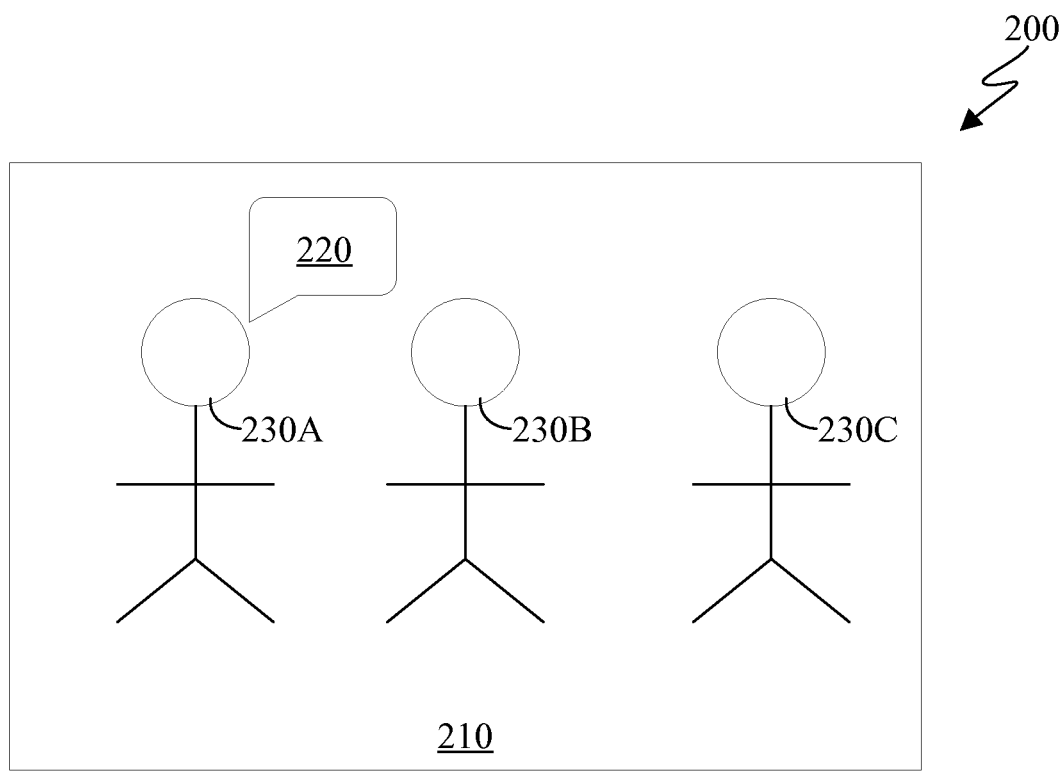
FIGS. 2A and 2B are user interface diagrams depicting one embodiment of a group communication environment in accordance with the present invention.
Figure 2B:
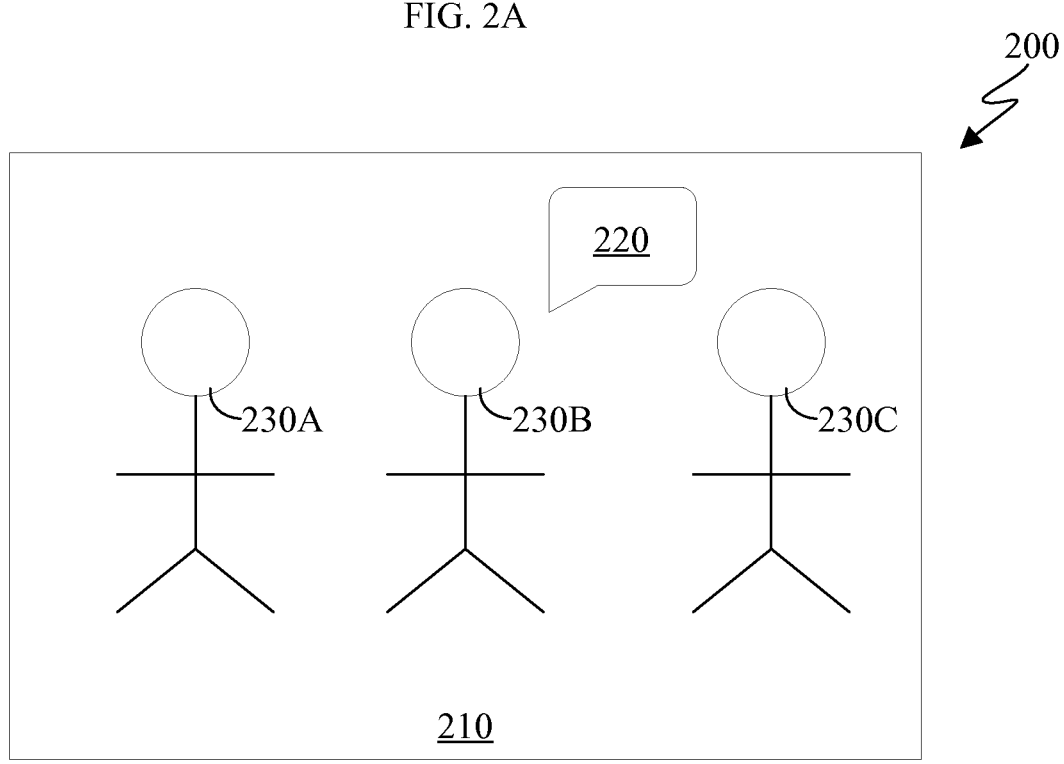

FIGS. 2A and 2B are diagrams of one embodiment of a group communication environment user interface 200 in accordance with the present invention. As depicted, the user interface 200 includes content 210, chat message 220, and chat avatars 230A-230C. As each chatter sends a chat message, the chat message may be displayed to the other participants next to that chatter's particular chat avatar. For example, FIG. 2A may depict a chat message 220 whose sender's avatar is chat avatar 230A, whereas FIG. 2B may depict a chat message 220 whose sender's avatar is chat avatar 230B.

The content 210 may include content that is a hyperlink or media such as audio, video, and/or pictures. In some embodiments, the content may be a table, graph, chart, schedule, or other representation of data. In the depicted embodiment, the dynamic content is a background image containing faces of chat participant(s). When each chat participant sends new chat content (e.g., a message) to the other participants, the message may be indicated as coming from that user's face in the background image. For example, the chat message may be represented as a speech bubble. In some embodiments, when the chat message is sent, the sender's face in the background image may light up, become highlighted, etc.

In some embodiments, the user who initiates the chat defines the threshold of how many chat participants need to be found in the background image. The user who initiates the chat may define if the content 210 is static or dynamic. For example, the content 210 may change every time a change in the chat topic is detected, the content 210 may remain the same throughout the entirety of the chat, or the content 210 may change every few topics. In some embodiments, the content 210 changes according to a pre-defined function of time and/or chat length. The content 210 may be a rotating collage of background images. In some embodiments, the participant(s) define where they want related topic links to social content displayed as either an overlay in the chat, in a separate chat tab, or in a separate window.

The chat message 220 may include any message content that is associated with a group chat such as text, emoticons, animations (such as gifs), media, hyperlinks, or the like. In some embodiments, the most recently send chat message 220 of each chat participant is visualized as coming from that chat participant's avatar 230. In other embodiments, only the recent message(s) 220 are depicted in the chat. The chat may have a history function that allows users to scroll forwards or backwards and see how the chat progressed at the speed of their choosing or in real-time. In the depicted example, the participant who corresponds to avatar 230A sent the most recent chat message 220 in FIG. 2A; in FIG.

2B, the participant corresponding to avatar 230B sends a chat message 220 and the chat interface 200 updates accordingly.

The chat avatars 230A-230C may include representations of the chat participants. In some embodiments, the avatars 230 are areas of a photograph that correlate to the participant's face. Rather than faces of the participants, the dynamic content may contain avatar representations of each chat participant, such as cartoon characters or anthropomorphized objects. When the content 210 changes, the chat message 220 may be repositioned based on the new position of participants' avatars 230.

Figure 3:
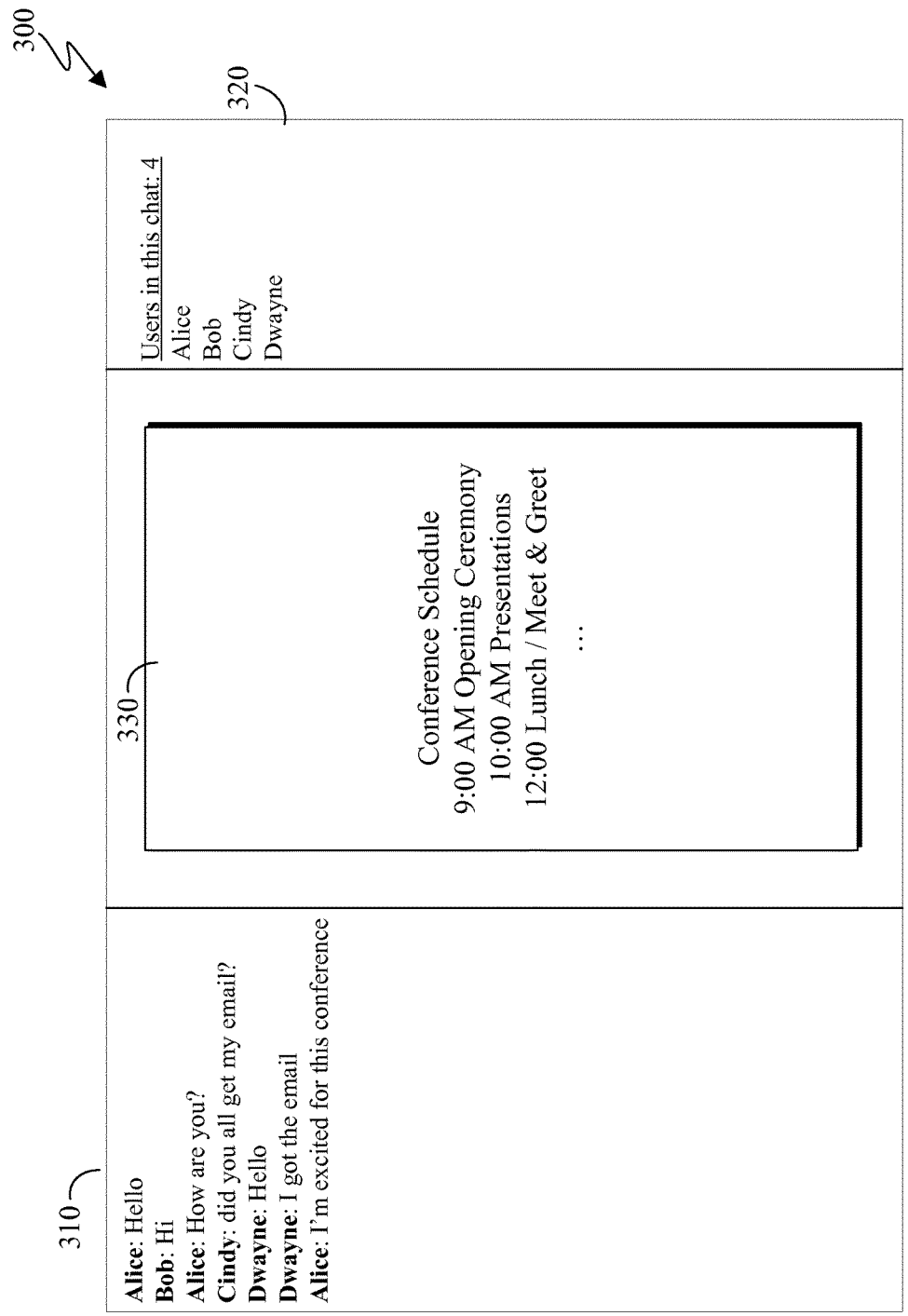
FIG. 3 is a user interface diagram depicting one embodiment of a group communication environment in accordance with the present invention.

FIG. 3 is a user interface diagram of one embodiment of a group communication environment user interface 300 in accordance with the present invention. As depicted, the user interface 300 includes chat history 310, chat user list 320, and displayed content 330. This user interface 300 may enhance the users' communications by displaying content relating to the topic of discussion.

The chat history 310 includes the recent communications passed between the participants. In some embodiments, the recent communications are time-stamped. The recent communications may be ranked in chronological order; for example, when Alice said "I'm excited for this conference", Alice may have been the most recent participant to send a communication. The chat user list 320 may provide a listing of all of the participants. In some embodiments, the chat user list 320 provides details such as whether participants are active/inactive, how long the participants have been logged in, which participant(s) are superusers, administrators, or hosts, and the like.

Displayed content 330 may refer to any of the sort of content 220 that had been discussed previously. In the depicted embodiment, chat history 310 indicates that one of the topics of discussion is a conference; accordingly, the displayed content 330 is a conference schedule. In other embodiments, user interface 300 may place the chat history 310, user list 320, or displayed content 330 in other locations, overlap some of these elements, or omit some of these elements.

Figure 4:
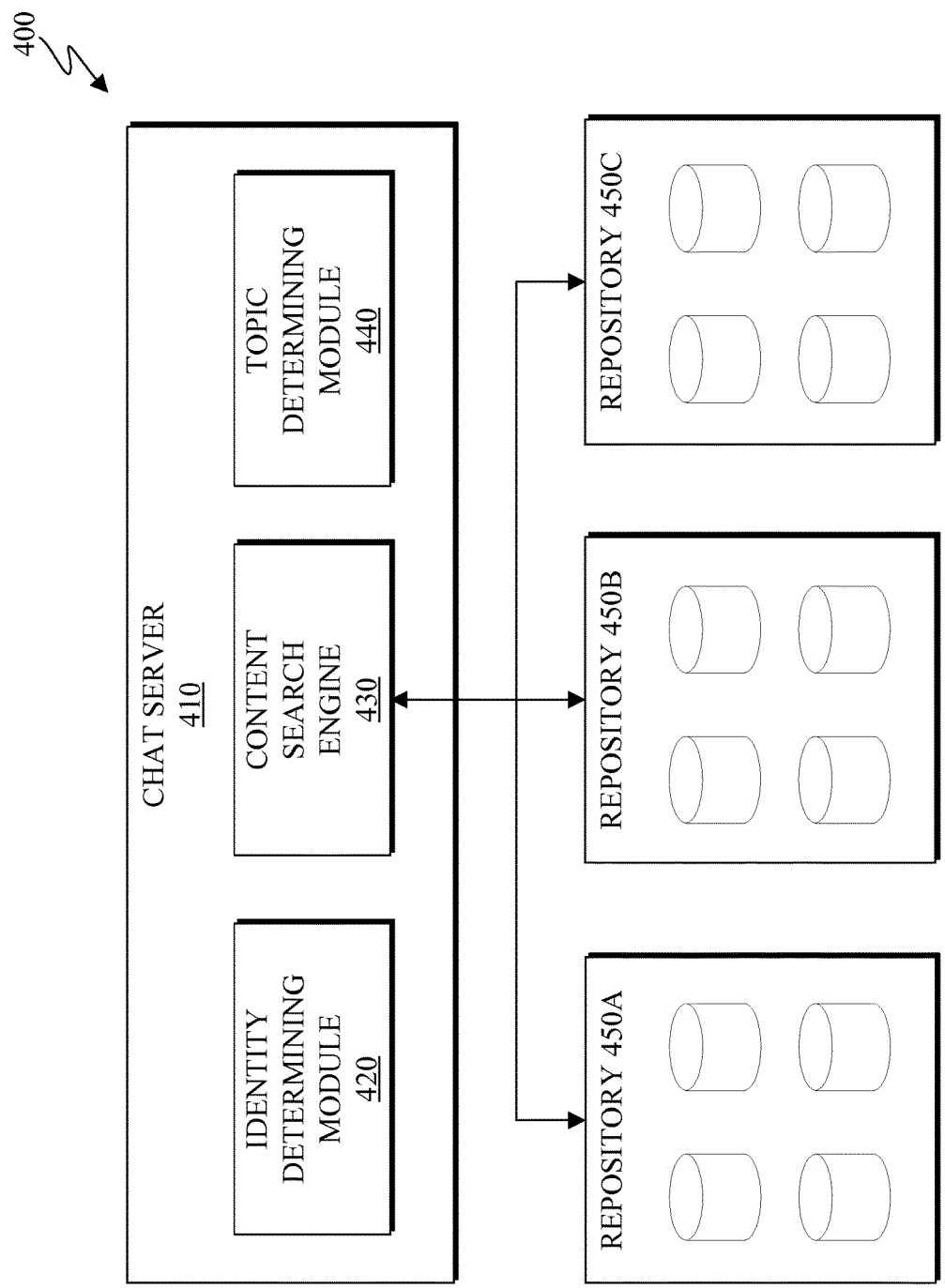
FIG. 4 is a block diagram depicting one embodiment of an infrastructure model for a group communication environment in accordance with the present invention.

FIG. 4 is a block diagram of one embodiment of an infrastructure model 400 in accordance with the present invention. As depicted, the infrastructure model 400 includes a chat server 410, an identity determining module 420, a content search engine 430, a topic determining module 440, and several data repositories 450A-450C. The infrastructure model 400 may provide functionality to a chat server to enable the operations of the dynamic updating method 100.

The chat server 410 may include a system that enables the transmission of messages among multiple chat participants. In some embodiments, the transmission of messages occurs in a real-time fashion. The chat server 410 may address point-to-point communications as well as multicast communications from one sender to many receivers and voice and video chat, or may be a feature of a web conferencing service. In some embodiments, the chat server 410 is hosted either locally on one of the participants' devices, or on a web server or a cloud server.

The identity determining module 420 determines the identity of each of chat participants and relays the identities to the content search engine 430. In some embodiments, the chat participants' user account is the same name as their social media account(s), or is otherwise linked to their accounts. In other embodiments, the identity determining module 420 accesses databases that translate chat participants' chat user names into their real-world identity, or some identity which the participants' depictions may be tagged as in social media.

The content search engine 430 enables the discovery of content appropriate for the chat based on such factors as the topic being discussed and the identities of the chat participants. In some embodiments, the content search engine 430 accesses repository 450 in order to obtain content to display in the chat. The data repositories 450A-450C represent an abstraction of the types of databases that may be accessed as there may be more or fewer than three. In some embodiments, these repositories are either repositories publicly accessible on the internet, repositories that are accessible using credentials of one or more of the chat participants, or a combination of these. For example, the content search engine 430 may search repositories that include image search engine results for the participants' identities and/or private media storage accounts that belong to one or more of the participants.

The topic determining module 440 enables the topic of the group communication session to be determined by analyzing the chat participants' messages over time. In some embodiments, the topic determining module 440 uses natural language processing techniques, as discussed earlier.

Figure 5:
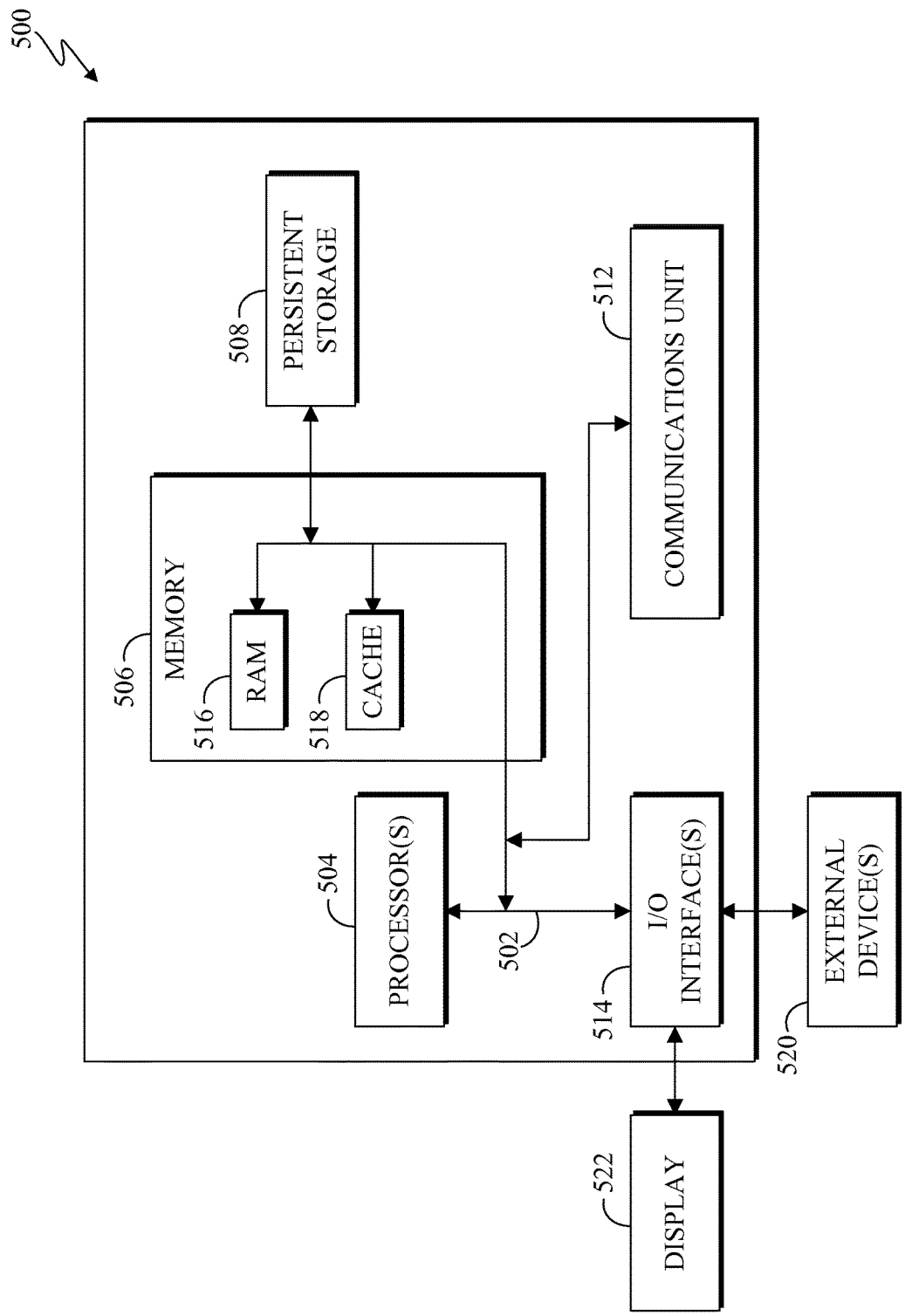
FIG. 5 is a block diagram depicting one example of a computing apparatus (i.e., computer) suitable for executing the methods disclosed herein.

FIG. 5 is a block diagram depicting components of a computer 500 suitable for executing the methods disclosed herein. The computer 500 may be one embodiment of the systems in the infrastructure model 400 depicted in FIG. 4. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 504 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 514 allows for input and output of data with other devices that may be connected to computer 500. For example, I/O interface 514 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 514. I/O interface(s) 514 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for group communication, the method comprising:
    determining a topic of a communication session, wherein the communication session has a plurality of participants;
    determining an identity for each participant of the plurality of participants;
    searching one or more repositories for content corresponding to the topic and the identity of each participant, wherein the content comprises a single image containing faces of a group, wherein the group includes a subset of the plurality of participants in accordance with a threshold of how many participants are to be found in the single image;
    retrieving the content;
    displaying, using a display, the content to the plurality of participants; and
    responsive to a participant commenting in the communication session, displaying a speech indicator at the face of the participant, wherein the speech indicator comprises the participant's comment.

2. The method of claim 1, further comprising pre-defining a relationship between the topic and the content.

3. The method of claim 1, wherein determining the topic of the communication session comprises applying natural language processing, wherein the natural language processing includes lemmatization and an ontology-driven technique, wherein the ontology-drive technique includes a functional decomposition of a sentence, and wherein the functional decomposition includes a subject, a predicate, and an object.

4. The method of claim 1, further comprising sharing the communication session and content on a social media website.

5. A computer system for group communication, the computer system comprising:
    one or more computer processors;
    one or more computer readable storage media;
    program instructions stored therein for execution by at least one of the one or more computer processors, the program instructions comprising instructions to:
    determine a topic of a communication session, wherein the communication session has a plurality of participants;
    determine an identity for each participant of the plurality of participants;
    search one or more repositories for content corresponding to the topic and the identity of each participant, wherein the content comprises a single image containing faces of a group, wherein the group includes a subset of the plurality of participants in accordance with a threshold of how many participants are to be found in the single image;
    retrieve the content;
    display, using a display, the content to the plurality of participants; and
    responsive to a participant commenting in the communication session, display a speech indicator at the face of the participant, wherein the speech indicator comprises the participant's comment.

6. The computer system of claim 5, further comprising instructions to pre-define a relationship between the topic and the content.

7. The computer system of claim 5, wherein the instructions to determine the topic of the communication session comprise instructions to apply natural language processing, wherein the natural language processing includes lemmatization and an ontology-driven technique, wherein the ontology-drive technique includes a functional decomposition of a sentence, and wherein the functional decomposition includes a subject, a predicate, and an object.

8. The computer system of claim 5, further comprising instructions to share the communication session and content on a social media website.

9. A computer program product for group communication, the computer program product comprising:
    a computer readable storage medium and program instructions stored on the computer readable storage medium, the program instructions comprising instructions to:
    determine a topic of a communication session, wherein the communication session has a plurality of participants;
    determine an identity for each participant of the plurality of participants;
    search one or more repositories for content corresponding to the topic and the identity of each participant, wherein the content comprises a single image containing faces of a group, wherein the group includes a subset of the plurality of participants in accordance with a threshold of how many participants are to be found in the single image;
    retrieve the content;
    display, using a display, the content to the plurality of participants;
    responsive to a participant commenting in the communication session, display a speech indicator at the face of the participant, wherein the speech indicator comprises the participant's comment.

10. The computer program product of claim 9, further comprising instructions to pre-define a relationship between the topic and the content.

11. The computer program product of claim 9, wherein the instructions to determine the topic of the communication session comprise instructions to apply natural language processing, wherein the natural language processing includes lemmatization and an ontology-driven technique, wherein the ontology-drive technique includes a functional decomposition of a sentence, and wherein the functional decomposition includes a subject, a predicate, and an object.

* * * * *